United States Patent [19]

Ong et al.

[11] Patent Number: 5,382,493
[45] Date of Patent: Jan. 17, 1995

[54] HYDROXYGERMANIUM PHTHALOCYANINE PROCESSES

[75] Inventors: Beng S. Ong, Mississauga, Canada; Terry L. Bluhm, Pittsford, N.Y.; Cheng-Kuo Hsiao; James M. Duff, both of Mississauga, Canada

[73] Assignee: Xerox Corporation, Stamford, Conn.

[21] Appl. No.: 105,264

[22] Filed: Aug. 12, 1993

[51] Int. Cl.6 .......................... G03G 5/06; C09B 67/50
[52] U.S. Cl. ..................................... 430/135; 540/141
[58] Field of Search ..................... 430/76, 83, 73, 135; 540/141, 142, 143

[56] References Cited

U.S. PATENT DOCUMENTS

| | | | |
|---|---|---|---|
| 4,031,109 | 6/1977 | Griffiths et al. | 430/76 |
| 4,032,339 | 6/1977 | Grushkin et al. | 430/1 |
| 4,555,463 | 11/1985 | Hor et al. | 430/59 |
| 4,557,989 | 12/1985 | Branston et al. | 430/59 |
| 4,587,189 | 5/1986 | Hor et al. | 430/59 |
| 5,189,156 | 2/1993 | Mayo et al. | 540/141 |

*Primary Examiner*—John Goodrow
*Attorney, Agent, or Firm*—E. O. Palazzo

[57] ABSTRACT

A process for the preparation of Type II dihydroxygermanium phthalocyanine which comprises treating dihalogermanium phthalocyanine or dialkoxygermanium phthalocyanine with a strong acid, followed by treatment with water, and subsequent optional washing with an organic base and an aprotic organic solvent.

14 Claims, 4 Drawing Sheets

HYDROXYGERMANIUM PHTHALOCYANINE PROCESSES

BACKGROUND OF THE INVENTION

This invention is generally directed to germanium phthalocyanines and processes for the preparation thereof, and more specifically the present invention is directed to processes for the preparation of dihydroxygermanium phthalocyanine. In embodiments, the process of the present invention comprises the formation of a new polymorph of dihydroxygermanium phthalocyanine, which is herein referred to as Type II dihydroxygermanium phthalocyanine [(HO)$_2$GePc-Type II]. This new polymorph can be obtained, for example, by the reaction of dihalogermanium phthalocyanine with a strong acid, such as concentrated sulfuric acid, followed by treatment with water and then with an organic base such as pyridine, and optionally washing with an organic solvent to remove the base. Alternatively, dialkoxygermanium phthalocyanine can also be utilized as a precursor in the reaction with an acid instead of dihalogermanium phthalocyanine with essentially similar results. Type II dihydroxygermanium phthalocyanine can be selected as organic photogenerator pigments in layered photoresponsive imaging members with charge transport layers, especially hole transport layers containing hole transport molecules such as known tertiary aryl amines. The aforementioned photoresponsive imaging members can be negatively charged when the photogenerating layer is situated between the hole transport layer and the substrate, or positively charged when the hole transport layer is situated between the photogenerating layer and the supporting substrate. The layered photoconductive imaging members can be selected for a number of different known imaging and printing processes including, for example, electrophotographic imaging processes, especially xerographic imaging and printing processes wherein negatively charged or positively charged images are rendered visible using toner compositions of appropriate charge polarity. In general, the imaging members are sensitive in the wavelength region of from about 550 to about 900 nanometers, and in particular, from 700 to about 850 nanometers, thus diode lasers can be selected as the light source.

Dihydroxygermanium phthalocyanine is a known infrared photoresponsive photogenerator pigment, and can be prepared from dichlorogermanium phthalocyanine by treatment with concentrated sulfuric acid, followed with water, and washing with water or aqueous base as disclosed, for example, in U.S. Pat. No. 4,557,989, the disclosure of which is totally incorporated herein by reference. The resulting dihydroxygermanium phthalocyanine has been shown to exhibit a crystalline polymorph (herein referred to as Type I) whose solid state absorption spectrum extends from about 500 to over 1,000 nanometers. Layered photoresponsive imaging members using Type I dihydroxygermanium phthalocyanine generally exhibit reasonably high photosensitivities in the 600 to 900 nanometers spectral region with generally high dark decay characteristics. Photoresponsive imaging members with Type II dihydroxygermanium phthalocyanine photogenerator pigment as prepared using the processes of the present invention possess substantially improved characteristics such as higher photosensitivity, better cyclic stability, and the like as illustrated herein.

In Konica Japanese 64-17066/89, there is disclosed, for example, the use of a new crystal modification of titanyl phthalocyanine (TiOPc) prepared from alpha-type TiOPc (Type II) by milling it in a sand mill with salt and polyethylene glycol. This publication also discloses that this new polymorph differs from alpha-type pigment in its light absorption and shows a maximum absorbance at 817 nanometers while the alpha-type exhibits a maximum at 830 nanometers. The Konica publication also discloses the use of this new form of TiOPc in a layered electrophotographic device having high photosensitivity at exposure radiation of 780 nanometers. Further, this new polymorph of TiOPc is also described in U.S. Pat. No. 4,898,799 and in a paper presented at the Annual Conference of Japan Hardcopy in July 1989. In this paper, this same new polymorph is referred to as Type y, and reference is also made to Types I, II and III as A, B, and C, respectively.

Layered photoresponsive imaging members have been described in a number of U.S. Patents, such as U.S. Pat. No. 4,265,900, the disclosure of which is totally incorporated herein by reference, wherein there is illustrated an imaging member comprised of a photogenerating layer, and an aryl amine hole transport layer. Examples of photogenerating layer components include trigonal selenium, metal phthalocyanines, vanadyl phthalocyanines, and metal free phthalocyanines. Additionally, there is described in U.S. Pat. No. 3,121,006 a composite xerographic photoconductive member comprised of finely divided particles of a photoconductive inorganic compound dispersed in an electrically insulating organic resin binder. The binder materials disclosed in the '006 patent comprise a material which is incapable of transporting for any significant distance injected charge carriers generated by the photoconductive particles.

The use of certain perylene pigments as photoconductive substances is also known. There is thus described in Hoechst European Patent Publication 0040402, DE3019326, filed May 21, 1980, the use of N,N'-disubstituted perylene3,4,9,10-tetracarboxyldiimide pigments as photoconductive substances. Specifically, there is, for example, disclosed in this publication N,N'-bis(3-methoxypropyl)perylene-3,4,9, 10-tetracarboxyldiimide dual layered negatively charged photoreceptors with improved spectral response in the wavelength region of 400 to 700 nanometers. A similar disclosure is revealed in Ernst Gunther Schlosser, *Journal of Applied Photographic Engineering*, Vol. 4, No. 3, page 118 (1978). There are also disclosed in U.S. Pat. No. 3,871,882 photoconductive substances comprised of specific perylene-3,4,9,10-tetracarboxylic acid derivative dyestuffs. In accordance with the teachings of this patent, the photoconductive layer is preferably formed by vapor depositing the dyestuff in a vacuum. Also, there are specifically disclosed in this patent dual layer photoreceptors with perylene-3,4,9,10-tetracarboxylic acid diimide derivatives, which have spectral response in the wavelength region of from 400 to 600 nanometers. Also, in U.S. Pat. No. 4,555,463, the disclosure of which is totally incorporated herein by reference, there is illustrated a layered imaging member with a chloroindium phthalocyanine photogenerating layer. In U.S. Pat. No. 4,587,189, the disclosure of which is totally incorporated herein by reference, there is illustrated a layered imaging member with a perylene pigment photogenerating component. Both of the aforementioned patents disclose an aryl amine component as a hole transport layer.

In copending application U.S. Ser. No. 537,714 (D/90087), the disclosure of which is totally incorporated herein by reference, there are illustrated photoresponsive imaging members with photogenerating titanyl phthalocyanine layers prepared by vacuum deposition, it is indicated in this copending application that the imaging members comprised of the vacuum deposited titanyl phthalocyanines and aryl amine hole transporting compounds exhibit superior xerographic performance with low dark decay characteristics and high photosensitivity, particularly in comparison to several prior art imaging members prepared by solution coating or spray coating, reference for example U.S. Pat. No. 4,429,029 mentioned hereinbefore.

In U.S. Pat. No. 5,153,313 (D/90244), the disclosure of which is totally incorporated herein by reference, there is illustrated a process for the preparation of phthalocyanine composites which comprises adding a metal-free phthalocyanine, a metal phthalocyanine, a metalloxy phthalocyanine or mixtures thereof to a solution of trifluoroacetic acid and a monohaloalkane; adding to the resulting mixture a titanyl phthalocyanine; adding the resulting solution to a mixture that will enable precipitation of said composite; and recovering the phthalocyanine composite precipitated product.

In U.S. Pat. No. 5,166,339 (D/90198), the disclosure of which is totally incorporated herein by reference, there is illustrated a process for the preparation of titanyl phthalocyanine which comprises the reaction of titanium tetrapropoxide with diiminoisoindolene in N-methylpyrrolidone solvent to provide Type I or β-type titanyl phthalocyanine as determined by X-ray powder diffraction analysis; dissolving the resulting titanyl phthalocyanine in a mixture of trifluoroacetic acid and methylene chloride; adding the resulting mixture to a stirred organic solvent, such as methanol, or to water; separating the resulting precipitate by, for example, vacuum filtration through a glass fiber paper in a Buchner funnel; and washing the titanyl phthalocyanine product. Examples of titanyl phthalocyanine reactants that can be selected in effective amounts of, for example, from about 1 weight percent to about 40 percent by weight of the trifluoroacetic acidic solvent mixture include known available titanyl phthalocyanines; titanyl phthalocyanines synthesized from the reaction of titanium halides such as titanium trichloride, titanium tetrachloride or tetrabromide, titanium tetraalkoxides such as titanium tetra-methoxide, -ethoxide, -propoxide, -butoxide, -isopropoxide and the like; and other titanium salts with compounds such as phthalonitrile and diiminoisoindolene in solvents such as 1-chloronaphthalene, quinoline, N-methylpyrrolidone, and alkylbenzenes such as xylene at temperatures of from about 120° to about 300° C.; specific polymorphs of titanyl phthalocyanine such as Type I, II, III, and IV, the preparation of which, for example, is described in the literature; or any other suitable polymorphic form of TiOPc; substituted titanyl phthalocyanine pigments having from 1 to 16 substituents attached to the outer ring of the compound, said substituent being, for example, halogens such as chloro-, bromo-, iodo- and fluoro-, alkyls with from 1 to about 6 carbon atoms such as methyl-, ethyl-, propyl-, isopropyl-, butyl-, pentyl-, and hexyl-; nitro, amino, alkoxy and alkylthio, such as methoxy-, ethoxy- and propylthio- groups; and mixtures thereof.

Disclosed in U.S. Pat. No. 5,164,493 (D/90524) is a process for the preparation of titanyl phthalocyanine Type [which comprises the acidition of titanium tetraaikoxide in a solvent to a mixture of phthalonitrile and a diiminoisoindolene, followed by heating. The disclosure of this application is totally incorporated herein by reference. Disclosed in U.S. Pat. No. 5,189,156 (D/91152) is a process for the preparation of titanyl phthalocyanine Type I which comprises the reaction of titanium tetraalkoxide and diiminoisoindolene in the presence of a halonaphthalene solvent; and U.S. Pat. No. 5,206,359 (D/91151) is a process for the preparation of titanyl phthalocyanine which comprises the treatment of titanyl phthalocyanine Type X with a halobenzene, the disclosures of which are totally incorporated herein by reference.

The disclosures of all of the aforementioned publications, laid open applications, copending applications and patents are totally incorporated herein by reference.

SUMMARY OF THE INVENTION

It is an object of the present invention to provide processes for the preparation of dihydroxygermanium phthalocyanine and imaging members thereof with many of the advantages illustrated herein.

Another object of the present invention relates to the provision of improved layered photoresponsive imaging members with photosensitivity to near infrared radiations.

It is yet another object of the present invention to provide simple and economical processes for the preparation of Type II dihydroxygermanium phthalocyanine.

In a further object of the present invention there are provided processes for the preparation of Type II dihydroxygermanium phthalocyanine from dihalogermanium phthalocyanine, dialkoxygermanium phthalocyanine or other similar polymorphs of dihydroxygermanium phthalocyanine by stirring in concentrated sulfuric acid, followed by treatment with water, filtering and washing the resulting pigment product with water several times as needed to remove excess acid but still ensuring that the filtrate of washing never exceeded a pH of 1.0, and neutralizing any acid residuals on the filtered pigment with an amine, and optionally washing the pigment product with an aprotic organic solvent.

Moreover, in another object of the present invention there are provided processes for the conversion of other polymorphs of dihydroxygermanium phthalocyanine to the Type II polymorph with improved photogenerating characteristics, excellent low dark decay properties, and other acceptable electrical characteristics, especially as compared to Type I dihydroxygermanium phthalocyanine.

A further object of the present invention relates to the preparation of electrically pure Type II dihydroxygermanium phthalocyanine in excellent yield, and its use thereof in electrophotographic processes.

In still a further object of the present invention there are provided photoresponsive imaging members with an aryl amine hole transport layer, and a photogenerator layer comprised of Type II dihydroxygermanium phthalocyanine pigment components obtained by the processes illustrated herein.

The xerographic electrical properties of the imaging members can be determined by known means, including as indicated herein electrostatically charging the surfaces thereof with a corona discharge source until the surface potentials, as measured by a capacitively coupled probe attached to an electrometer, attained an initial value $V_o$ of about $-800$ volts. After resting for 0.5 second in the dark, the charged members attained a surface potential of $V_{ddp}$, dark development potential. Each member was then exposed to light from a filtered Xenon lamp with a XBO 150 watt bulb, thereby inducing a photodischarge which resulted in a reduction of surface potential to a $V_{bg}$ value, background potential. The percent of photodischarge was calculated as $100 \times (V_{ddp}-V_{bg})/V_{ddp}$. The desired wavelength and energy of the exposed light was determined by the type of filters placed in front of the lamp. The monochromatic light photosensitivity was determined using a narrow band-pass filter. The photosensitivity of the imaging members is usually provided in terms of the amount of exposure energy in ergs/cm$^2$, designated as $E_{\frac{1}{2}}$, required to achieve 50 percent photodischarge from the dark development potential. The higher the photosensitivity, the smaller is the $E_{\frac{1}{2}}$ value.

These and other objects of the present invention can be accomplished in embodiments thereof by the provision of processes for the preparation of dihydroxygermanium phthalocyanine, especially Type II polymorph, and photoresponsive imaging members thereof. More specifically, in embodiments of the present invention there are provided processes for the preparation of Type II dihydroxygermanium phthalocyanine, which comprises the reaction of phthalonitrile or diiminoisoindolene with tetrahalogermanium or tetraalkoxygermanium in a suitable solvent, treatment of the resultant dihalogermanium phthalocyanine or dialkoxygermanium phthalocyanine intermediate with concentrated sulfuric acid, and then water, and filtering and-washing of the dihydroxygermanium phthalocyanine precipitate with water using care that the filtrate of the washing does not exceeds a pH of 1.0, removing the absorbed acid on the dihydroxygermanium phthalocyanine product with an organic base, such as amine, and optionally washing the pigment crystals with an aprotic organic solvent, such as an alkylene halide like methylene chloride, tetrahydrofuran, or dimethylformamide. Another embodiment of the present invention relates to the preparation of Type dihydroxygermanium phthalocyanine by polymorphic conversion from other polymorphs, such as Type I polymorph, by simply treating with concentrated sulfuric acid, followed by the same washing processes as described above. The different polymorphic forms of dihydroxygermanium phthalocyanine can be readily identified by various known analytical methods including solid state absorption spectra and X-ray powder diffraction analysis (XRPD). FIGS. 1 and 2 show, respectively, the solid state absorption spectrum and X-ray powder diffraction pattern of Type I polymorph of dihydroxygermanium phthalocyanine, while FIGS. 3 and 4 depict those of the Type II polymorph.

Specifically, one embodiment of the present invention is directed to processes for the preparation of Type II polymorph of dihydroxygermanium phthalocyanine by reacting about 4 molar equivalents of phthalonitrile or diiminoisoindolene with one molar equivalent of tetrahalogermanium such as tetrachlorogermanium in a suitable solvent, such as chloronaphthalene, N-methyl pyrrolidone, quinoline, or dimethylformamide at a temperature of from 100° C. to over 200° C. under an inert atmosphere for about 1 hour to about 8 hours. After the reaction, the reaction mixture is cooled down to about 100° C. to 150° C. and filtered. The collected dichlorogermanium phthalocyanine intermediate is washed several times with boiling dimethylformamide and then with hot methanol, and is dried in vacuo at about 75° C. To convert dichlorogermanium phthalocyanine to dihydroxygermanium phthalocyanine, 1 part by weight of dichlorogermanium phthalocyanine is added in small portions to about 10 to about 50 parts by weight of concentrated sulfuric acid over a period of 15 to 30 minutes, and the mixture is stirred at room temperature for 1 to about 4 hours. The resulting solution is then added slowly to crushed ice or ice cold water over a period of 15 minutes to 1 hour. The precipitated dihydroxygermanium phthalocyanine pigment is filtered, and washed a number of times, such as 10, with water and wherein the flitrate of washing does not exceed a pH of 1.0. Subsequently, the resulting pigment product is stirred in suspension in an organic base, such as pyridine, for 5 minutes to 1 hour, filtered, and then optionally slurried in an aprotic solvent, such as tetrahydrofuran, to remove pyridine, filtered, and then dried in vacuo at 75° C. Both the X-ray powder diffraction pattern and solid state absorption spectrum evidence that the dihydroxygermanium phthalocyanine prepared is in a Type II polymorphic form.

Another embodiment of the present invention relates to the preparation of Type II dihydroxygermanium phthalocyanine using the tetraalkoxygermanium precursor, such as tetraethoxygermanium, via similar processes as described above with the exception that tetraalkoxygermanium is utilized in place of tetrahalogermanium. An additional embodiment of the present invention provides an efficient polymorphic conversion procedure whereby other polymorphs of dihydroxygermanium phthalocyanine can be readily converted to Type II polymorph. The procedure involves treatment of other polymorphic forms of dihydroxygermanium phthalocyanine with concentrated sulfuric acid and then water, followed by washing with a liquid organic base, such as pyridine, and an optional aprotic organic solvent, such as tetrahydrofuran, in essentially the same manner as described above for the conversion of dichlorogermanium phthalocyanine pigment to Type II dihydroxygermanium phthalocyanine.

Numerous different layered photoresponsive imaging members with the Type II dihydroxygermanium phthalocyanine pigment obtained by the processes of the present invention can be fabricated. In embodiments, thus the layered photoresponsive imaging members are comprised of a supporting substrate, a charge transport layer, especially an aryl amine hole transport layer, and situated therebetween a photogenerator layer comprised of the Type II dihydroxygermanium phthalocyanine photogenerating pigment. Another embodiment of the present invention is directed to positively charged layered photoresponsive imaging members comprised of a supporting substrate, a charge transport layer, especially an aryl amine hole transport layer, and as a top overcoating layer Type II dihydroxygermanium phthalocyanine pigment obtained with the processes of the present invention. Moreover, there is provided in accordance with the present invention an improved negatively charged photoresponsive imaging member comprised of a supporting substrate, a thin adhesive layer, a Type II dihydroxygermanium phthalocyanine photogenerator obtained by the processes of the present invention dispersed in a polymeric resinous binder, such as poly(vinyl butyral), and as a top layer aryl amine hole transporting molecules dispersed in a polymeric resinous binder such as polycarbonate.

The photoresponsive imaging members of the present invention can be prepared by a number of known methods, the process parameters and the order of coating of the layers being dependent on the member desired. The imaging members suitable for positive charging can be prepared by reversing the order of deposition of photogenerator and hole transport layers. The photogenerating and charge transport layers of the imaging members can be coated as solutions or dispersions onto selective substrates by the use of a spray coater, dip coater, extrusion coater, roller coater, wire-bar coater, slot coater, doctor blade coater, gravure coater, and the like, and dried at from 40° to about 200° C. for from 10 minutes to several hours under stationary conditions or in an air flow. The coating is accomplished to provide a final coating thickness of from 0.01 to about 30 microns after it has dried. The fabrication conditions for a given layer can be tailored to achieve optimum performance and cost in the final device.

Imaging members of the present invention are useful in various electrostatographic imaging and printing systems, particularly those conventionally known as xerographic processes. Specifically, the imaging members of the present invention are useful in xerographic imaging processes wherein the Type II dihydroxygermanium phthalocyanine pigment absorbs light of a wavelength of from about 550 to about 900 nanometers, and preferably from about 700 to about 800 nanometers. In these known processes, electrostatic latent images are initially formed on the imaging member followed by development, and thereafter transferring the image to a suitable substrate. Imaging members employing Type II dihydroxygermanium phthalocyanine photogenerator pigment of the present invention exhibit high photosensitivities, generally with $E_{\frac{1}{2}}$ of about 2.0 ergs/cm$^2$ or less, even when exposed to monochromatic radiation of about 700 to 800 nanometers. Other important attributes of the aforementioned imaging members include long electrical cyclic life and stable environmental stability.

Moreover, the imaging members of the present invention can be selected for electronic printing processes with gallium arsenide light emitting diode (LED) arrays which typically function at wavelengths of from 660 to about 830 nanometers.

One negatively charged photoresponsive imaging member of the present invention is comprised, in the order indicated, of a supporting substrate, an adhesive layer comprised, for example, of a polyester 49,000 available from Goodyear Chemical, a photogenerator layer composed of Type II dihydroxygermanium phthalocyanine obtained with the process of the present invention, optionally dispersed in an inactive polymer binder, and a hole transport layer thereover comprised of N,N'-diphenyl-N,N'-bis(3methyl phenyl)-1,1'-biphenyl-4,4'-diamine dispersed in a polycarbonate binder, and a positively charged photoresponsive imaging member. It is comprised of a substrate, thereover a charge transport layer comprised of N,N'-diphenyl-N,N'-bis(3-methyl phenyl)-1,1'-biphenyl-4,4'-diamine dispersed in a polycarbonate binder, and a top photogenerator layer comprised of Type II dihydroxygermanium phthalocyanine obtained with the process of the present invention optionally dispersed in an inactive polymer binder.

BRIEF DESCRIPTION OF THE DRAWINGS

For a better understanding of the present invention and further features thereof, reference is made to the following detailed description of various preferred embodiments wherein.

Figure 1:
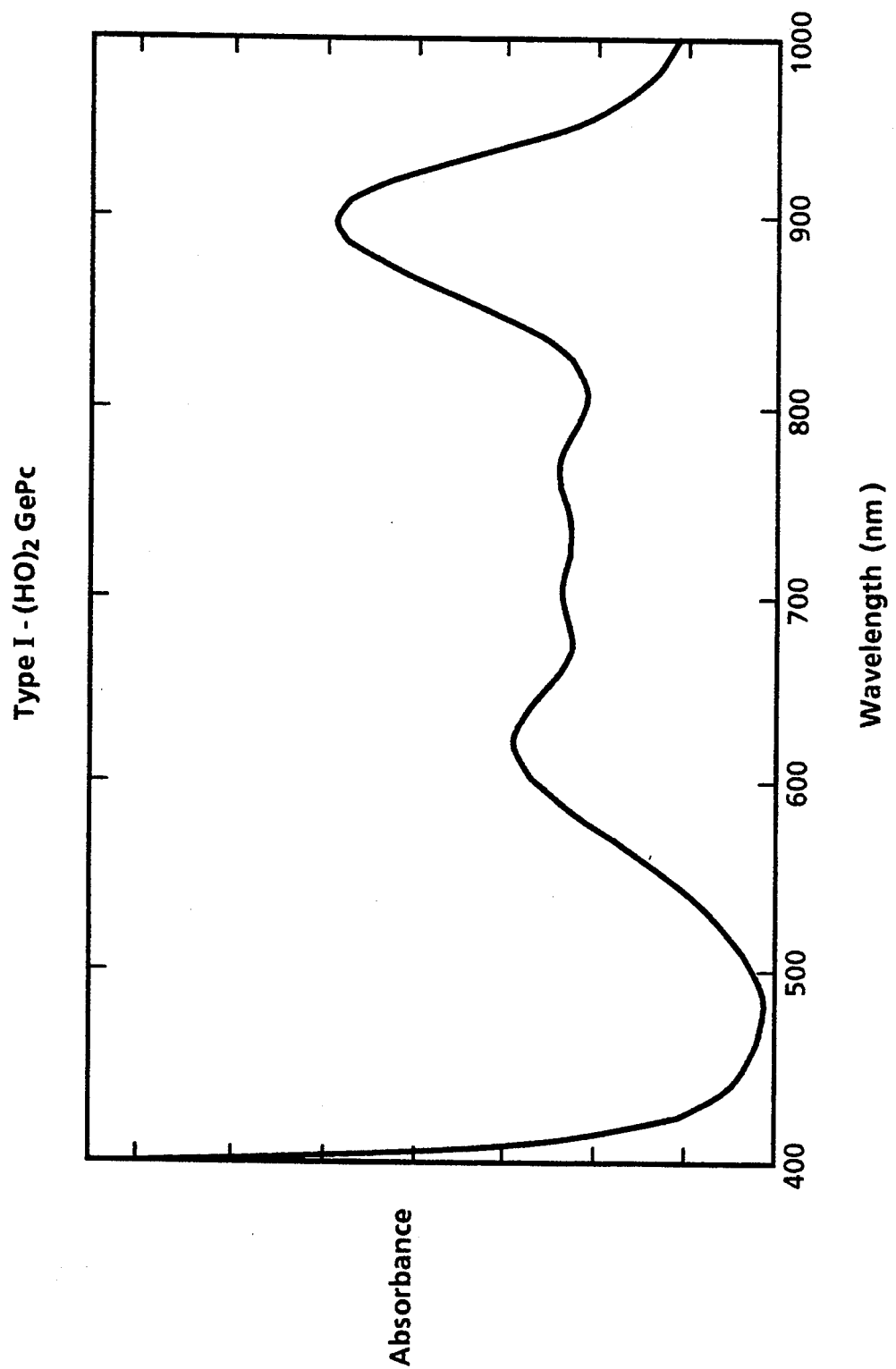
FIGS. 1 and 2 are, respectively, the solid state absorption spectrum and XRPD for Type I dihydroxygermanium phthalocyanine.
Figure 2:
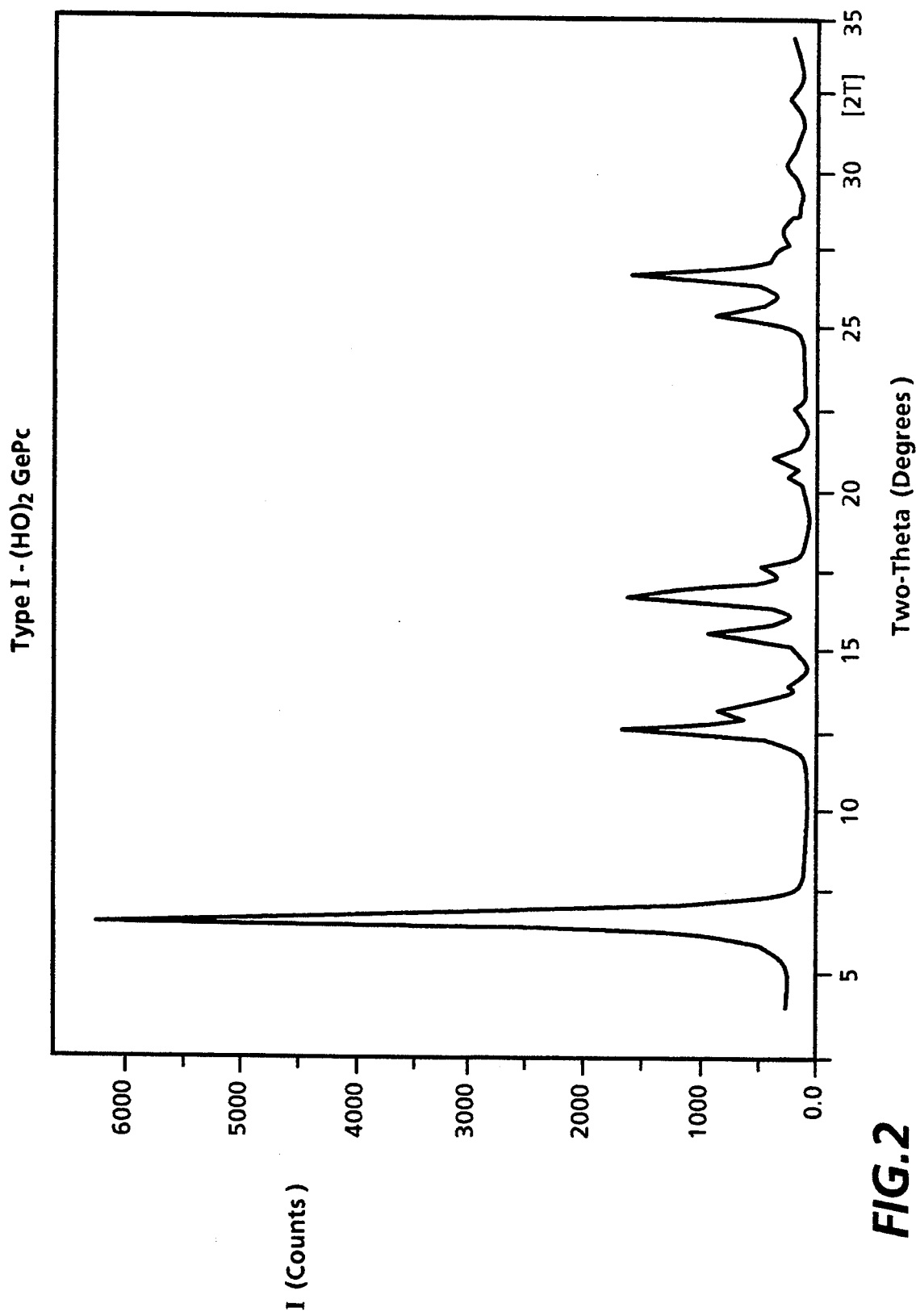
Figure 3:
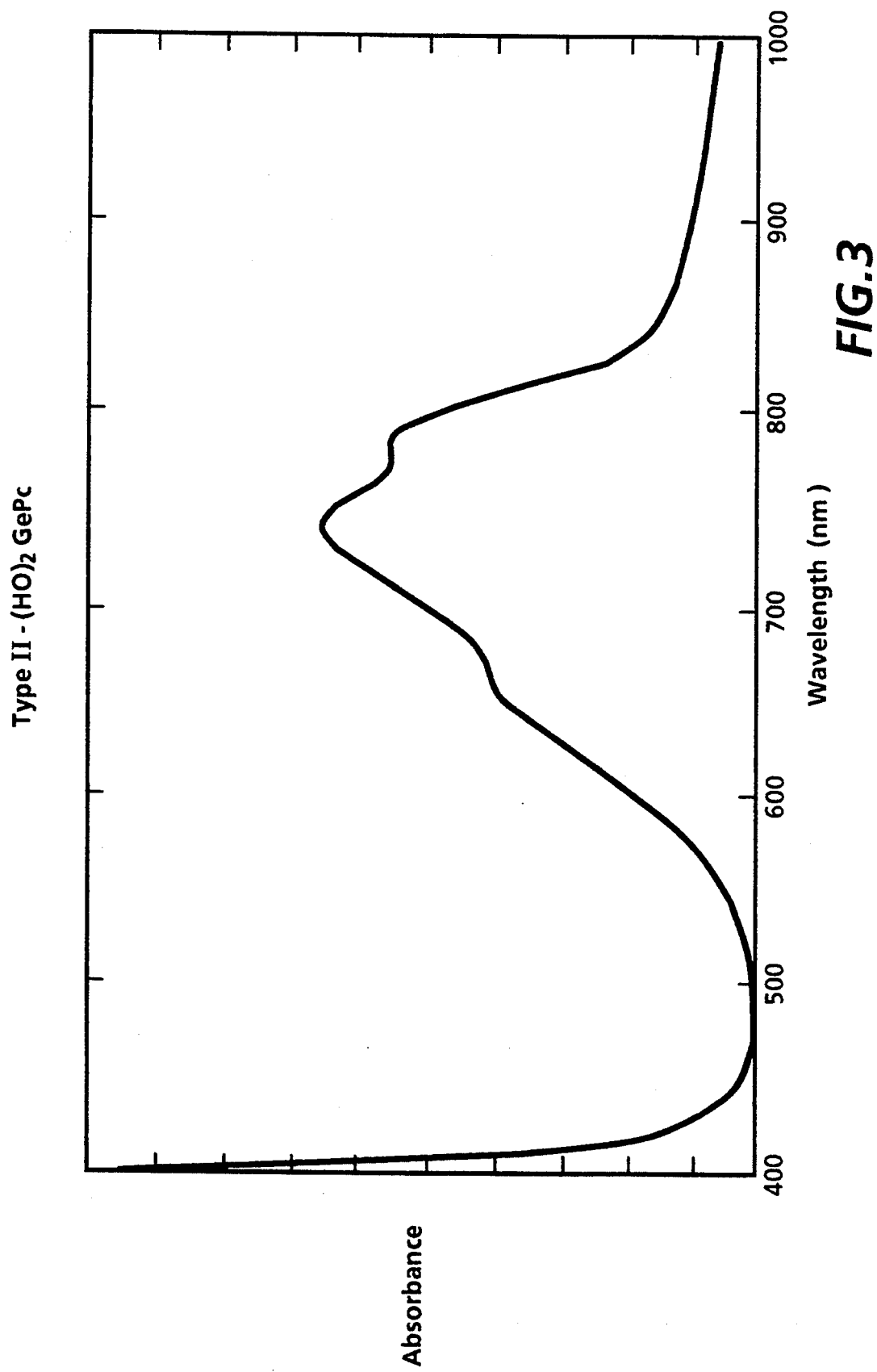
FIGS. 3 and 4 are those for Type II dihydroxygermanium phthalocyanine.
Figure 4:
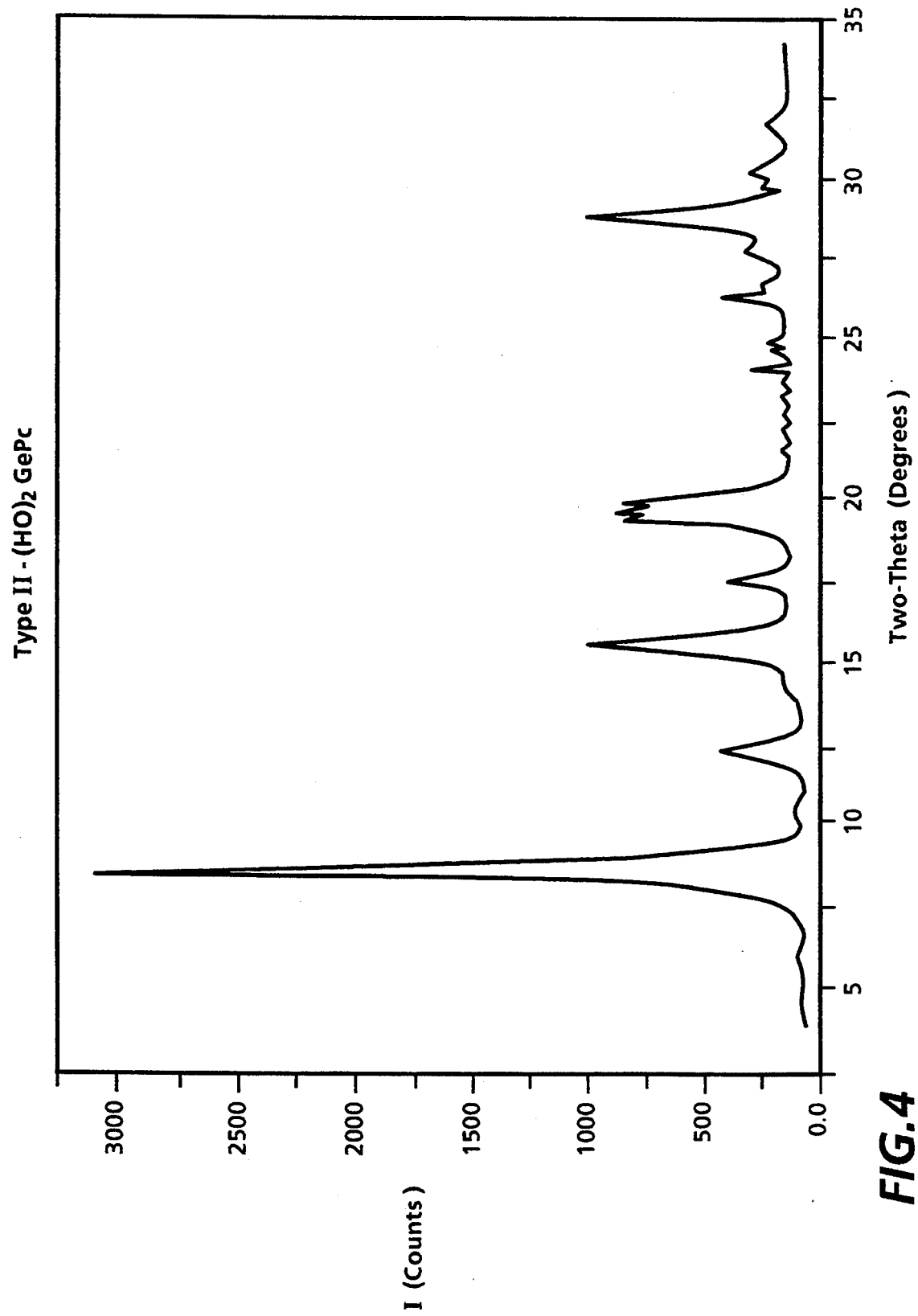

Substrate layers selected for the imaging members of the present invention can be opaque or substantially transparent, and may comprise any suitable material having the requisite mechanical properties. Thus, the substrate may comprise a layer of insulating material including inorganic or organic polymeric materials, such as MYLAR ® a commercially available polymer, MYLAR ® containing titanium, a layer of an organic or inorganic material having a semiconductive surface layer such as indium tin oxide, or aluminum arranged thereon, or a conductive material inclusive of aluminum, chromium, nickel, brass or the like. The substrate may be flexible, seamless, or rigid and many have a number of many different configurations, such as for example a plate, a cylindrical drum, a scroll, an endless flexible belt and the like. In one embodiment, the substrate is in the form of a seamless flexible belt. In some situations, it may be desirable to coat on the back of the substrate, particularly when the substrate is a flexible organic polymeric material, an anticurl layer, such as for example polycarbonate materials commercially available as MAKROLON ®.

The thickness of the substrate layer depends on many factors, including economical considerations, thus this layer may be of substantial thickness, for example over 3,000 microns, or of minimum thickness providing there are no adverse effects on the system. In one embodiment, the thickness of this layer is from about 75 microns to about 300 microns.

With further regard to the imaging members, the photogenerator layer is comprised of Type II dihydroxygermanium phthalocyanine obtained with the processes of the present invention dispersed in polymer binders. Generally, the thickness of the photogenerator layer depends on a number of factors, including the thicknesses of the other layers and the amount of photogenerator material contained in this layer. Accordingly, this layer can be of a thickness of from about 0.05 micron to about 10 microns when the dihydroxygermanium phthalocyanine photogenerator composition is present in an amount of from about 5 percent to about 100 percent by volume. In one embodiment, this layer is of a thickness of from about 0.25 micron to about 1 micron when the photogenerator composition is present in this layer in an amount of 30 to 75 percent by volume. The maximum thickness of this layer in an embodiment is dependent primarily upon factors, such as photosensitivity, electrical properties and mechanical considerations. The photogenerator layer can be fabricated by coating a dispersion of Type II dihydroxygermanium phthalocyanine obtained with the processes of the present invention in a suitable solvent with or without an optional polymer binder material. The dispersion can be prepared by mixing and/or milling the Type II dihydroxygermanium phthalocyanine in equipment such as paint shakers, ball mills, sand mills and attritors. Common grinding media such as glass beads, steel balls or ceramic beads may be used in this equipment. The binder resin may be selected from a number of known polymers such as poly(vinyl butyral), poly(vinyl carbazole), polyesters, polycarbonates, poly(vinyl chloride), polyacrylates and methacrylates, copolymers of vinyl chloride and vinyl acetate, phenoxy resins, polyurethanes, poly(vinyl alcohol), polyacrylonitrile, polystyrene, and the like. In embodiments of the present invention, it is desirable to select a coating solvent that does not disturb or adversely affect the other previously coated layers of the device. Examples of solvents that can be selected for use as coating solvents for the photogenerator layer are ketones, alcohols, aromatic hydrocarbons, halogenated aliphatic hydrocarbons, ethers, amines, amides, esters, and the like. Specific examples are cyclohexanone, acetone, methyl ethyl ketone, methanol, ethanol, butanol, amyl alcohol, toluene, xytene, chlorobenzene, carbon tetrachloride, chloroform, methylene chloride, trichloroethylene, tetrahydrofuran, dioxane, diethyl ether, dimethylformamide, dimethylacetamide, butyl acetate, ethyl acetate and methoxyethyl acetate, and the like.

The coating of the photogenerator layer in embodiments of the present invention can be accomplished with spray, dip or wire-bar methods such that the final dry thickness of the photogenerator layer is from 0.01 to 30 microns and preferably from 0.1 to 15 microns after being dried at 40° to 150° C. for 5 to 90 minutes.

Illustrative examples of polymeric binder materials that can be selected for the photogenerator pigment include those polymers as disclosed in U.S. Pat. No. 3,121,006, the disclosure of which is totally incorporated herein by reference.

As adhesives usually in contact with the supporting substrate, there can be selected various known substances inclusive of polyesters, polyamides, poly(vinyl butyral), poly(vinyl alcohol), polyurethane and polyacrylonitrile. This layer is of a thickness of from about 0.001 micron to about 1 micron. Optionally, this layer may contain conductive and nonconductive particles, such as zinc oxide, titanium dioxide, silicon nitride, carbon black, and the like, to provide, for example, in embodiments of the present invention desirable electrical and optical properties.

Aryl amines selected for the hole transporting layer, which generally is of a thickness of from about 5 microns to about 75 microns, and preferably of a thickness of from about 10 microns to about 40 microns, include molecules of the following formula:

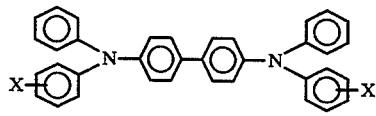

dispersed in a highly insulating and transparent polymer binder, wherein X is an alkyl group or a halogen, especially those substituents selected from the group consisting of Cl and $CH_3$.

Examples of specific aryl amines are N,N'-diphenyl-N,N'-bis(alkylphenyl)-1,1-biphenyl-4,4'-diamine wherein alkyl is selected from the group consisting of methyl, ethyl, propyl, butyl, hexyl, and the like; and N,N'-diphenyl-N,N'-bis(halophenyl)-1,1'-biphenyl-4,4'-diamine wherein the halo substituent is preferably a chloro substituent. Other known charge transport layer molecules can be selected, reference for example U.S. Pat. Nos. 4,921,773 and 4,464,450, the disclosures of which are totally incorporated herein by reference.

Examples of the highly insulating and transparent polymer binder material for the transport layers include materials such as those described in U.S. Pat. No. 3,121,006, the disclosure of which is totally incorporated herein by reference. Specific examples of polymer binder materials include polycarbonates, acrylate polymers, vinyl polymers, cellulose polymers, polyesters, polysiloxanes, polyamides, polyurethanes and epoxies as well as block, random or alternating copolymers thereof. Preferred electrically inactive binders are comprised of polycarbonate resins having a molecular weight of from about 20,000 to about 100,000 with a molecular weight of from about 50,000 to about 100,000 being particularly preferred. Generally, the transport layer contains from about 10 to about 75 percent by weight of the charge transport material, and preferably from about 35 percent to about 50 percent of this material.

Also, included within the scope of the present invention are methods of imaging and printing with the photoresponsive devices illustrated herein. These methods generally involve the formation of an electrostatic latent image on the imaging member, followed by developing the image with a toner composition, reference U.S. Pat. Nos. 4,560,635; 4,298,697 and 4,338,390, the disclosures of which are totally incorporated herein by reference, subsequently transferring the image to a suitable substrate, and permanently affixing the image thereto. In those environments wherein the device is to be used in a printing mode, the imaging method involves the same steps with the exception that the exposure step can be accomplished with a laser device or image bar.

The following Examples are provided.

EXAMPLE [

Type II dihydroxygermanium phthalocyanine was prepared from dichlorogermanium phthalocyanine by reaction with concentrated sulfuric acid, followed by treatment with water, and washing with an organic base in accordance with the following procedure.

A suspension of 280.0 grams of diiminoisoindolene in 1.5 liter of 1-chloronaphthalene was mechanically stirred in a 3-liter flask fitted with a thermometer, a mechanical stirrer and a water condenser under a nitrogen atmosphere. One hundred (100) grams of germanium tetrachloride were slowly added to the suspension, and the resulting mixture was heated to reflux, and then maintained at this temperature for 2.5 hours. Subsequently, the reaction mixture was cooled to about 100° C., and filtered through a sintered glass funnel. The crude product was washed five times with 100 milliliters, respectively, of boiling dimethylformamide, then with 500 milliliters of methanol, and was dried in vacuo at 75° C. overnight yielding 61.4 grams of blue crystals of dichloro germanium phthalocyanine.

Twenty-five (25.0) grams of dichlorogermanium phthalocyanine as prepared in accordance with the above procedure were added in small portions, about 1 gram each, to 350 milliliters of concentrated sulfuric acid with continuous stirring over a period of 20 to 30 minutes. The resulting black solution was stirred at room temperature for 4 hours, and was then poured slowly onto 2.0 kilograms of crushed ice over a period of about 1 hour. The precipitated blue dihydroxygermanium phthalocyanine product was filtered, washed two or three times with water, and wherein the product was not over-washed to the extent that the flitrate of washing exceeded a pH of 1.0. After drying, the dihydroxygermanium phthalocyanine crystals were slurried in 300 milliliters of pyridine and filtered. The filtered cake was reslurried in 300 milliliters of tetrahydrofuran for 30 minutes, filtered, and washed twice with tetrahydrofuran to remove pyridine. 24.90 Grams of Type II dihydroxygermanium phthalocyanine was obtained after drying in vacuo at 75° C. for 24 hours.

EXAMPLE II

An alternate synthesis of Type II dihydroxygermanium phthalocyanine from tetraalkoxygermanium is described bellow.

13.93 grams of diiminoisoindolene and 6.30 grams of tetraethoxygermanium were added to 80 milliliters of N-methyl pyrrolidone in a 250 milliliter flask fitted with a mechanical stirrer and a water condenser. The mixture was stirred and heated to reflux under a nitrogen atmosphere. The suspension dissolved as the heating proceeded, and dark blue precipitate began to form at around 170° C. Thereafter, the reaction mixture was held at reflux temperature for 2.5 hours before it was cooled down to 150° C., and filtered. The blue precipitate was washed by slurrying in 100 milliliters of boiling dimethylformamide and filtered, and the same washing procedure was repeated twice before a final washing with methanol was carried out. The blue precipitate was subsequently treated with concentrated sulfuric acid, followed by washing with water, pyridine and then tetrahydrofuran in accordance with the procedure of Example I thereby affording 10.26 grams of Type II dihydroxygermanium phthalocyanine.

EXAMPLE III

Type II dihydroxygermanium phthalocyanine was also obtained from other polymorphic forms of dihydroxygermanium phthalocyanine, such as the Type I polymorph, by treatment with sulfuric acid in accordance with the procedure of Example I. The conversion of other polymorphs of dihydroxygermanium phthalocyanine to the Type II form was generally efficient offering yields in excess of 90 percent.

EXAMPLE IV

A photoresponsive imaging member was fabricated by coating an aluminized MYLAR ® substrate (3 mils) with a solution comprised of 6.5 grams of acetylacetonate tributoxyzirconium and 0.75 gram of (3-aminopropyl)trimethoxysilane in 28.5 grams of isopropanol and 14.3 grams of butanol using a wire wound rod applicator. The coated layer was dried at 140° C. for 10 minutes giving a dry thickness of 0.1 micron. A photogenerator dispersion was prepared by milling a mixture of 0.56 gram of Type II dihydroxygermanium phthalocyanine obtained in Example I and 20.0 grams of 1.3 percent of poly(vinyl butyral) in butyl acetate in a 60 milliliter jar containing 70 grams of glass beads (1 millimeter diameter) by means of a paint shaker for 2 hours. The dispersion was then coated onto the zirconium layer as prepared above using the wire wound rod applicator, and dried at 100° C. for 10 minutes thereby forming a photogenerator layer of a thickness of 0.20 micron. The hole transport layer was prepared by coating a solution of 5.4 grams of N,N'-diphenyl-N,N'-bis (3-methylphenyl)-1,1'-biphenyl-4,4'-diamine and 8.1 grams of MAKROLON ® polycarbonate in 58.0 grams of chlorobenzene onto the photogenerator layer, and dried at 110° C. for 1 hour; the thickness of this layer was 27.0 microns.

The photoresponsive imaging member was evaluated by electrostatically charging its surface with a corona discharge device until the surface potential as measured by a capacitatively coupled probe attached to an electrometer reached an initial dark potential ($V_o$) of about −800 volts. After resting in the dark for 0.5 second, the surface potential of the imaging member decayed to a dark development potential ($V_{ddp}$), and the imaging member was then exposed to a monochromatic radiation of 780 nanometers to effect photoinduced discharge; a reduction in the surface potential from $V_{ddp}$ to a background potential ($V_{bg}$) was observed. The half-exposure energy, $E_{\frac{1}{2}}$, the exposure energy required to effect the reduction of the surface potential to half of $V_{ddp}$, was determined. The percentage of photodischarge at 5 and 10 ergs/cm² exposure energy was also calculated from $(V_{ddp}-V_{bg})/V_{ddp}\times 100$. For this imaging member, $E_{\frac{1}{2}}$ was 1.8 ergs/cm², and the percent discharge at 5 ergs/cm² and 10 ergs/cm² exposure energy were, respectively, 75 percent and 87 percent.

EXAMPLE V

A photoresponsive imaging member employing Type II dihydroxygermanium phthalocyanine obtained in Example II was fabricated in accordance with the procedure of Example IV. For this imaging member, $E_{\frac{1}{2}}$ of 2.2 ergs/cm² was obtained. The percent discharge at exposure energy of 5 ergs/cm² and 10 ergs/cm² were, respectively, 79 percent and 85 percent.

Other modifications of the present invention may occur to those skilled in the art subsequent to a review of the present application and these modifications, including equivalents thereof, are intended to be included within the scope of the present invention.

What is claimed is:

1. A process for the preparation of Type II dihydroxygermanium phthalocyanine consisting essentially of treating at a temperature of from 0° C. to about 50° C. dihalogermanium phthalocyanine or dialkoxygermanium phthalocyanine with a strong acid, followed by treatment with water, and subsequent optional washing with an organic base and an aprotic organic solvent.

2. A process for the preparation of Type II dihydroxygermanium phthalocyanine consisting essentially of contacting at a temperature of from 0° C. to about 50° C. dihalogermanium phthalocyanine or dialkoxygermanium phthalocyanine with concentrated sulfuric acid, followed by mixing with water, and washing with an organic base; and an aprotic organic solvent.

3. A process for the preparation of Type II dihydroxygermanium phthalocyanine of dihydroxygermanium phthalocyanine by mixing dihalogermanium phthalocyanine with a strong acid, mixing with water, and washing with an organic base; and an aprotic organic solvent.

4. A process in accordance with claim 1 wherein the organic base is pyridine or trialkylamine.

5. A process in accordance with claim 1 wherein the optional organic solvent is a haloalkane, tetrahydrofuran, or dimethylformamide.

6. A process in accordance with claim 2 wherein the organic base is pyridine or trialkylamine.

7. A process in accordance with claim 2 wherein the organic solvent is a haloalkane, tetrahydrofuran, or dimethylformamide.

8. A process in accordance with claim 3 wherein the strong acid is concentrated sulfuric acid.

9. A process in accordance with claim 3 wherein the organic base is pyridine or trialkylamine.

10. A process in accordance with claim 3 wherein the organic solvent is a haloalkane, tetrahydrofuran, or dimethylformamide.

11. A process in accordance with claim 1 wherein treating with a strong acid is accomplished by adding dihalogermanium phthalocyanine or dialkoxygermanium phthalocyanine to the acid at a temperature ranging from 0° C. to about 50° C., followed by stirring for about 5 minutes to about 10 hours, and then pouring the mixture onto ice or into ice cold water with continuous stirring, filtering, and subsequently washing with said organic base; and an aprotic organic solvent.

12. A process in accordance with claim 3 wherein the treatment with strong acid is accomplished by adding dihydroxygermanium phthalocyanine to the acid at a temperature ranging from 0° C. to about 50° C., followed by stirring for about 5 minutes to about 10 hours, and then pouring the mixture onto ice or into ice cold water with continuous stirring, filtering, and subsequently washing with said organic base; and aprotic organic solvent.

13. A process in accordance with claim 1 wherein 1 part by weight of dihalogermanium phthalocyanine or dialkoxygermanium phthalocyanine is treated with about 5 to about 50 parts by weight of sulfuric acid at a temperature ranging from about 0° C. to about 30° C. by continuous stirring, and an organic base and an organic solvent are employed washing said phthalocyanine Type II obtained.

14. A process in accordance with claim 13 wherein the base is pyridene and the solvent is tetrahydrofuran or methylene chloride.

* * * * *